(12) United States Patent
Wang et al.

(10) Patent No.: US 10,540,590 B2
(45) Date of Patent: Jan. 21, 2020

(54) METHOD FOR GENERATING SPATIAL-TEMPORALLY CONSISTENT DEPTH MAP SEQUENCES BASED ON CONVOLUTION NEURAL NETWORKS

(71) Applicant: ZHEJIANG GONGSHANG UNIVERSITY, Hangzhou, Zhejiang (CN)

(72) Inventors: Xun Wang, Zhejiang (CN); Xuran Zhao, Zhejiang (CN)

(73) Assignee: ZHEJIANG GONGSHANG UNIVERSITY, Hangzhou, Zhejiang (CN)

(*) Notice: Subject to any disclaimer, the term of this patent is extended or adjusted under 35 U.S.C. 154(b) by 7 days.

(21) Appl. No.: 16/067,819

(22) PCT Filed: Dec. 29, 2016

(86) PCT No.: PCT/CN2016/112811
§ 371 (c)(1),
(2) Date: Jul. 3, 2018

(87) PCT Pub. No.: WO2018/119807
PCT Pub. Date: Jul. 5, 2018

(65) Prior Publication Data
US 2019/0332942 A1    Oct. 31, 2019

(51) Int. Cl.
*G06N 3/08* (2006.01)
*G06N 3/04* (2006.01)
(Continued)

(52) U.S. Cl.
CPC .......... *G06N 3/084* (2013.01); *G06F 17/13* (2013.01); *G06F 17/16* (2013.01); *G06K 9/6215* (2013.01);
(Continued)

(58) Field of Classification Search
CPC ......... G06N 3/0472; G06T 7/10; G06T 17/16; G06T 2207/20081; G06T 2207/20084
See application file for complete search history.

(56) References Cited

U.S. PATENT DOCUMENTS

| 2015/0302592 A1* | 10/2015 | Bruls | G06T 7/13 348/44 |
| 2018/0018556 A1* | 1/2018 | Young | G06N 3/04 |
| 2018/0027224 A1* | 1/2018 | Javidnia | H04N 13/239 382/154 |

FOREIGN PATENT DOCUMENTS

| CN | 105657402 A | 6/2005 |
| CN | 106157307 A | 2/2012 |

(Continued)

OTHER PUBLICATIONS

"A 2D to 3D Conversion Scheme Based on Depth Cues Analysis for MPEG Videos," Guo-Shiang Lin1, Cheng-Ying Yeh, Wei-Chih Chen, and Wen-Nung Lie, 978-1-4244-7493-6/10/$26.00 © 2010 IEEE (Year: 2010).*

(Continued)

*Primary Examiner* — Hal Schnee (57) ABSTRACT

A method for generating spatial-temporal consistency depth map sequences based on convolutional neural networks for 2D-3D conversion of television works includes steps of: 1) collecting a training set, wherein each training sample thereof includes a sequence of continuous RGB images, and a corresponding depth map sequence; 2) processing each image sequence in the training set with spatial-temporal consistency superpixel segmentation, and establishing a spatial similarity matrix and a temporal similarity matrix; 3) establishing the convolution neural network including a single superpixel depth regression network and a spatial-temporal consistency condition random field loss layer; 4) training the convolution neural network; and 5) recovering a depth maps of a RGB image sequence of unknown depth through forward propagation with the trained convolution neural network; which avoids that clue-based depth recovery method is greatly depended on scenario assumptions, and inter-frame discontinuity between depth maps generated by conventional neural networks.

4 Claims, 4 Drawing Sheets

(51) Int. Cl.
  *G06T 7/00*   (2017.01)
  *G06F 17/16*  (2006.01)
  *G06T 7/10*   (2017.01)
  *G06K 9/62*   (2006.01)
  *G06F 17/13*  (2006.01)

(52) U.S. Cl.
  CPC ............. *G06N 3/0472* (2013.01); *G06T 7/10* (2017.01); *G06T 2207/20081* (2013.01); *G06T 2207/20084* (2013.01)

(56) References Cited

FOREIGN PATENT DOCUMENTS

| | | |
|---|---|---|
| CN | 101945299 A | 7/2013 |
| CN | 105095862 A | 7/2014 |

OTHER PUBLICATIONS

"Depth estimation with convolutional conditional random field network," Yan Hua and Hu Tian, http://dx.doi.org/10.1016/j.neucom.2016.06.029, 0925-2312 (Year: 2016).*

"Efficient Automatic Depth Estimation for Video," Richard Rzeszutek and Dimitrios Androutsos, 978-1-4673-5807-1/13/$31.00 copywrite Crown (Year: 2013).*

Chen Qichao, etc., Dreaming between the light and shadow—three-dimensional technology of two-dimensional film and television, Science Chinese, p. 88-89, Section 1-3.

* cited by examiner

Fig. 4 ly applied.
METHOD FOR GENERATING SPATIAL-TEMPORALLY CONSISTENT DEPTH MAP SEQUENCES BASED ON CONVOLUTION NEURAL NETWORKS

CROSS REFERENCE OF RELATED APPLICATION

This is a U.S. National Stage under 35 U.S.C 371 of the International Application PCT/CN2016/112811, filed Dec. 29, 2016.

BACKGROUND OF THE PRESENT INVENTION

Field of Invention

The present invention relates to the field of stereoscopic videos in computer vision, and more particularly to a method for generating spatial-temporally consistent depth map sequences based on convolution neural networks.

Description of Related Arts

The basic principle of stereoscopic video is to superimpose two images with horizontal parallax, and viewers respectively view them with left and right eyes through stereoscopic glasses to generate stereoscopic perception. Stereoscopic videos are able to render immersive three-dimensional view, which is deeply welcomed by consumers. However, with the popularity of 3D video hardware continues to rise, the 3D video content shortage followed. Directly shooting by the 3D camera is expensive and difficult to post-process, which is usually only used in large-cost movies. Therefore, 2D to 3D conversion technology for film and television works is an effective way to solve the shortage of film sources, which not only greatly expands the subject matter and the number of three-dimensional films, but also makes some of the classic films and television works to return to the screen.

Since the left and right parallax in the stereoscopic video are directly related to the depth of each pixel, obtaining the depth map corresponding to each frame of the video is the key in 2D to 3D conversion technology. Depth maps can be obtained by manually annotating depth values for each frame of the video, but at a very high cost. At the same time, there are also some semi-automatic depth map generation methods, wherein the depth map of some key frames in the video is drawn manually, and the computer propagates these depth maps to other adjacent frames by some propagation algorithms. Although these methods can save time to some extent, they still require heavy manual operations when dealing with large-scale 2D to 3D conversion of films and television works.

In contrast, fully automatic depth recovery methods can save the greatest labor costs. Some algorithms can recover depth maps using specific rules by using depth cues such as motion, focus, occlusions, or shadow, but are usually applicable only to specific scenes. For example, the structure from motion (SfM) approach is able to recover the depth of the static scenes shot by a moving camera according to the cue that the nearer objects display larger relative movement between consecutive frames than objects farer away, but this type of method is not applicable when the object moves or the camera is still. Focus-based depth recovery methods can restore the depth of the shallow field depth image; however, in the case of large field depth, it is less effective. Movies and television works usually contain a variety of scenes, so depth-based depth recovery methods are difficult to universally applied.

Convolutional neural network is a kind of deep neural network which is especially suitable for image. It consists of basic units such as convolution layer, activation layer, pooling layer and loss layer, which can simulate complex functions of image input x to specific output y, and the approach dominates many computer vision problems such as image classification, image segmentation and so on. In recent years, some methods have adopted convolution neural networks for depth estimation problem, using a large amount of data to learn the mapping from RGB image input to depth map output. Depth recovery based on convolution neural networks does not depend on any of assumptions, which has good universality and high recovery accuracy. Therefore, it has a great potential in the 2D-3D conversion of video works. However, the conventional methods are all based on single image optimization in training, while ignoring the continuity between frames. If such methods are used to restore the depth of image sequences, the depth map of the adjacent frames will be significantly inconsistent, resulting in flashing of the synthetic virtual view, which seriously affects the user perception. In addition, inter-frame continuity also provides important clues to depth recovery, which is simply ignored in conventional methods.

SUMMARY OF THE PRESENT INVENTION

For overcoming defects of convention technologies, an object of the present invention is to provide a method for generating a spatial-temporally consistent depth map sequences based on a convolution neural network, wherein the continuity of the RGB image and the depth map in the time domain is introduced into the convolution neural network, and the multi-frame images are jointly optimized during training, so as to generate a temporally continuous depth map in the time domain and improve the accuracy of the depth recovery.

Accordingly, in order to accomplish the above object, the present invention provides a method for generating spatial-temporally consistent depth map sequences based on convolution neural networks, comprising steps of:

1) collecting a training set, wherein each training sample of the training set comprises a continuous RGB (red, green, blue) image sequence of m frames, and a corresponding depth map sequence;

2) processing each image sequence in the training set with spatial-temporal consistency superpixel segmentation, and establishing a spatial similarity matrix $S^{(s)}$ and a temporal similarity matrix $S^{(t)}$;

3) building the convolution neural network structure, wherein the convolution neural network comprises a single superpixel depth regression network with a parameter W, and a spatial-temporal consistency condition random field loss layer with a parameter $\alpha$;

4) training the convolution neural network established in the step 3) with the continuous RGB image sequences and the corresponding depth map sequences in the training set, so as to obtain the parameter W and the parameter $\alpha$; and 5) recovering a depth map sequence of a RGB image sequence with unknown depth through forward propagation of the trained convolution neural network.

Preferably, the step 2) specifically comprises steps of:

(2.1) processing the continuous RGB image sequence in the training set with the spatial-temporal consistency superpixel segmentation, wherein an input sequence is marked as $I=[I_1, \ldots, I_m]$, where $I_t$ is a t-th frame of the m frames in total; the m frames are respectively divided into $n_1, \ldots, n_m$ superpixels by the spatial-temporal consistency superpixel segmentation while a corresponding relation between all superpixels in a later frame and superpixels corresponding to a same object in a former frame is generated; the whole image sequence comprise $$n = \sum_{t=1}^{m} n_t$$

superpixels; marking the real depth at a gravity center of each superpixel p as $d_p$, and defining a ground-truth depth vector of the n superpixels as $d=[d_1; \ldots; d_n]$;

(2.2) establishing the spatial similarity matrix $S^{(s)}$ of the n superpixels, wherein $S^{(s)}$ is an n×n matrix; $S_{pq}^{(s)}$ represents a similarity relationship of a superpixel p and a superpixel q in one frame, where:

$$S_{pq}^{(s)} = \{\exp(-\gamma\|c_p - c_q\|^2),$$

superpixels p and q are adjacent in one frame 0, else wherein $c_p$ and $c_q$ are color histogram features of the superpixel p and the superpixel q, and $\gamma$ is a manually determined parameter which is set to the median of $\|c_p - c_q\|^2$ of adjacent superpixels; and (2.3) establishing the temporal similarity matrix $S^{(t)}$ of the n superpixels, wherein $S^{(t)}$ is an n×n matrix; $S_{pq}^{(t)}$ represents a similarity relation of a superpixel p and a superpixel q in different frames:

$$S_{pq}^{(t)} = \begin{cases} 1, \text{ superpixels } p \text{ and } q \text{ correspond to each other in adjacent frames} \\ 0, \text{else} \end{cases}$$

wherein a corresponding relation between the superpixels of the adjacent frames is obtained by the spatial-temporal consistency superpixel segmentation of the step (2.1).

Preferably, in the step 3), the convolution neural network comprises the single superpixel depth regression network and a spatial-temporal consistency condition random field loss layer; wherein the step 3) specifically comprises steps of:

(3.1) for the single superpixel depth regression network comprising first 31 layers of a VGG16 network, a superpixel pooling layer and three fully connected layers, which performs average pooling in each superpixel space of the superpixel pooling layer; wherein an input of the network is continuous RGB images of m frames and the output of the network is an n-dimensional vector $z=[z_1, \ldots z_n]$, in which the p-th element $z_p$ is the estimated depth value, without considering any constraint, of the superpixel p of the continuous RGB image sequence after the spatial-temporal consistency superpixel segmentation; the convolution neural network parameter need to be learned is W; and (3.2) using the output $z=[z_1, \ldots z_n]$ of the single superpixel depth regression network obtained in the step (3.1), the real depth vector $d=[d_1; \ldots; d_n]$ of the superpixels obtained in the step (2.1), and the spatial similarity matrix $S_{pq}^{(s)}$ obtained in the step (2.2) as well as the temporal similarity matrix $S_{pq}^{(t)}$ obtained in the step (2.3) as the input of the spatial-temporal consistency condition random field loss layer; wherein a conditional probability function of a spatial-temporal consistency condition random field is:

$$P(d|I) = \frac{1}{Z(I)} \exp(-E(d, I))$$

wherein an energy function E(d, I) is defined as:

$$E(d, I) = \sum_{p \in N}(d_p - z_p)^2 + \sum_{(p,q) \in S} \alpha^{(s)} S_{pq}^{(s)}(d_p - d_q)^2 + \sum_{(p,q) \in T} \alpha^{(t)} S_{pq}^{(t)}(d_p - d_q)^2$$

wherein the first term $\Sigma_{p \in N}(d_p - z_p)^2$ of the energy function refers to a difference between an estimated value and a real value of a single superpixel; a second term $\Sigma_{(p,q) \in S} \alpha^{(s)} S_{pq}^{(s)} (d_p - d_q)^2$ is a spatial consistency constraint, which means depths will be similar if the superpixels p and q are adjacent in one frame with similar colors (i.e. $S_{pq}^{(s)}$ is larger); a third term $\Sigma_{(p,q) \in T} \alpha^{(t)} S_{pq}^{(t)} (d_p - d_p)^2$ is a temporal consistency constraint, which means the depths will be similar if the superpixels p and q refer to a same object in adjacent frames (i.e. $S_{pq}^{(t)}=1$); a matrix form of the energy function is:

$$E(d, I) = d^T L d - 2z^T d + z^T z$$

wherein:

$$L = \mathbb{I} + D - M$$

$$M = \alpha^{(s)} S^{(s)} + \alpha^{(t)} S^{(t)}$$

wherein $S^{(s)}$ is the spatial similarity matrix obtained in the step (2.2) and $S^{(t)}$ is the temporal similarity matrix obtained in the step (2.3); $\alpha^{(s)}$ and $\alpha^{(t)}$ are two parameters to be learned; $\mathbb{I}$ is an n×n unit matrix; D is a diagonal matrix, and $D_{pp} = \Sigma_{pq}$; wherein:

$$Z(I) = \int_d \exp(-E(d, I)) dd = \frac{\pi^{\frac{n}{2}}}{|L|} \exp(z^T L^{-1} z - z^T z)$$

wherein $L^{-1}$ is the inverse matrix of L, and $|L|$ is the determinant of matrix L;

therefore, a loss function is defined as a negative logarithm of the conditional probability function:

$$J = -\log P(d|I) = -d^T L d + 2z^T d - z^T L^{-1} z - \frac{1}{2} \log(|L|) + \frac{n}{2} \log(\pi).$$

Preferably, in the step 4), training the convolution neural network specifically comprises steps of:

(4.1) optimizing the parameters W, $\alpha^{(s)}$ and $\alpha^{(t)}$ using stochastic gradient descent, wherein for each iteration, the parameters are updated as:

$$W = W - lr \frac{\partial J}{\partial W}$$

$$\alpha^{(s)} = \alpha^{(s)} - lr \frac{\partial J}{\partial \alpha^{(s)}}$$

$$\alpha^{(t)} = \alpha^{(t)} - lr \frac{\partial J}{\partial \alpha^{(t)}}$$

wherein lr is the learning rate;

(4.2) calculating the partial derivative of parameter W partial with respect to the loss function J with:

$$\frac{\partial J}{\partial W} = 2(L^{-1} z - d)^T \frac{\partial z}{\partial W}$$

wherein $$\frac{\partial z}{\partial W}$$

is calculated with backward propagation of the convolution neural network layer by layer; and (4.3) respectively calculating the partial derivative of parameters $\alpha^{(s)}$ and $\alpha^{(t)}$ with respect to the loss function J as $$\frac{\partial J}{\partial \alpha^{(s)}}$$

and $$\frac{\partial J}{\partial \alpha^{(t)}}:$$

$$\frac{\partial J}{\partial \alpha^{(s)}} = d^T A^{(s)} d - z^T L^{-1} A^{(s)} L^{-1} z - \frac{1}{2} \mathrm{Tr}(L^{-1} A^{(s)})$$

$$\frac{\partial J}{\partial \alpha^{(t)}} = d^T A^{(t)} d - z^T L^{-1} A^{(t)} L^{-1} z - \frac{1}{2} \mathrm{Tr}(L^{-1} A^{(t)})$$

wherein $\mathrm{Tr}(\cdot)$ represents the trace of a matrix; $A^{(s)}$ is the partial derivative of the matrix L with respect to $\alpha^{(s)}$ and $A^{(t)}$ is the partial derivative of the matrix L with respect to $\alpha^{(t)}$, which are calculated with:

$$A_{pq}^{(s)} = -S_{pq}^{(s)} + \delta(p=q)\Sigma_a S_{pq}^{(s)}$$

$$A_{pq}^{(t)} = -S_{pq}^{(t)} + \delta(p=q)\Sigma_a S_{pq}^{(t)}$$

wherein $\delta(p=q)$ equals 1 when p=g, otherwise 0.

Preferably, in the step 5), recovering the depth-unknown RGB image sequence specifically comprises steps of:

(5.1) processing the RGB image sequence with the spatial-temporal consistency superpixel segmentation, and calculating the spatial similarity matrix $S^{(s)}$ and the temporal similarity matrix $S^{(t)}$;

(5.2) apply forward propagation to the RGB image sequence with the convolution neural network trained, so as to obtain a single superpixel network output z;

(5.3) calculating the depth output $\hat{d}=[\hat{d}_1; \ldots; \hat{d}_n]$ with spatial-temporal consistency constraint by:

$$\hat{d} = L^{-1} z$$

wherein the matrix L is calculated in the step (3.2); $\hat{d}_p$ represents an estimated depth value of a superpixel p in the RGB image sequence; and (5.4) applying $\hat{d}_p$ to a corresponding position of a corresponding frame of the superpixel p for obtaining a depth map of the m frames.

Beneficial effects of the present invention are as follows.

First, in contrast to cue-based depth recovery methods, the present invention uses convolution neural networks to learn function mapping from RGB images to depth maps, which is independent of the particular assumptions of the scene.

Second, compared with single-frame-optimizing convolutional neural network depth recovery methods, the present invention adds the spatial-temporal consistency constraint and jointly optimizes the multi-frame images by constructing the spatial-temporal consistency condition random field loss layer, which is able to output spatial-temporally consistent depth map, so as to avoid inter-frame jump of the depth map.

Thirdly, compared with the conventional depth recovery method based on convolution neural network, the present invention adds the spatial-temporal consistency constraint, so as to improve the accuracy of the depth recovery.

The present invention has been compared with the conventional methods such as Eigen, David, Christian Puhrsch, and Rob Fergus. "Depth map prediction from a single image using a multi-scale deep network." Advances in neural information processing systems. 2014, though a public data set NYU depth v2 and a data set LYB 3D-TV of the inventor. Results show that the method of the present invention can significantly improve the time-domain continuity of the depth map recovery, so as to improve the accuracy of the depth estimation.

DETAILED DESCRIPTION OF THE PREFERRED EMBODIMENT

Referring to the drawings, the present invention will be further illustrated.

Figure 1:
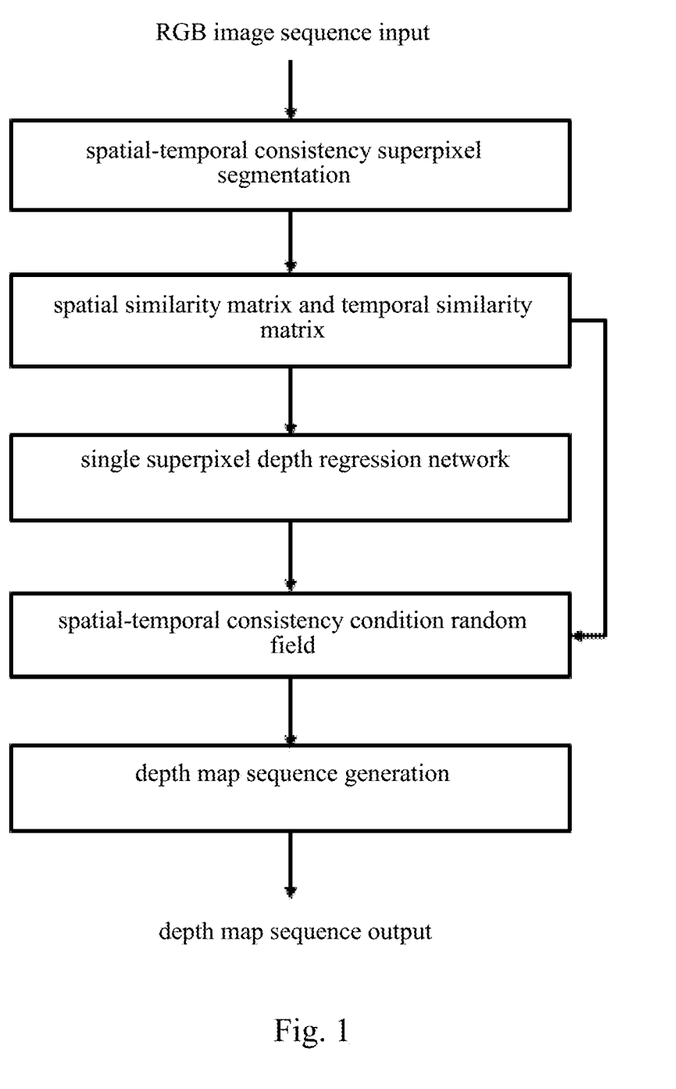
FIG. 1 is the flow chart of the present invention.
Figure 2:
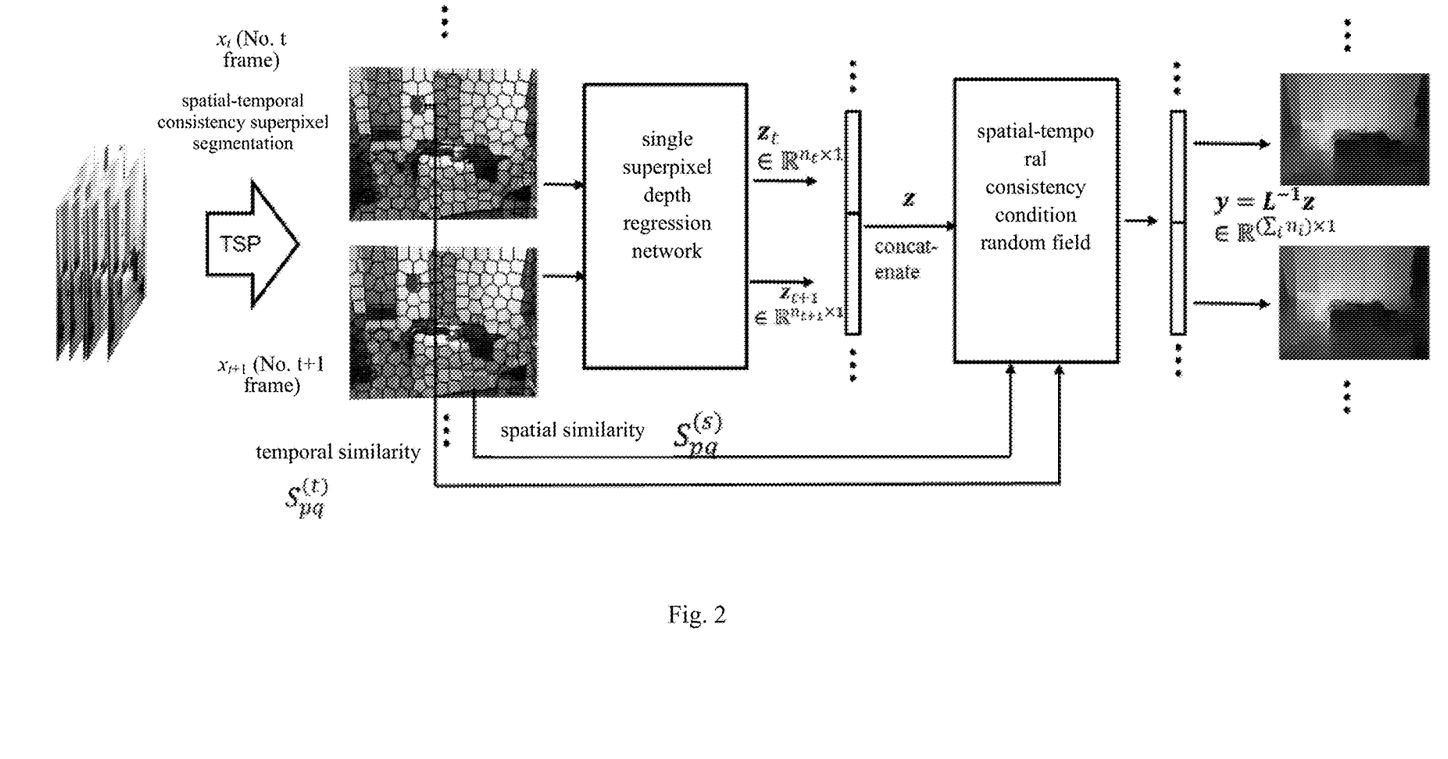
FIG. 2 is the model structure of the convolution neural network of the present invention.
Figure 3:
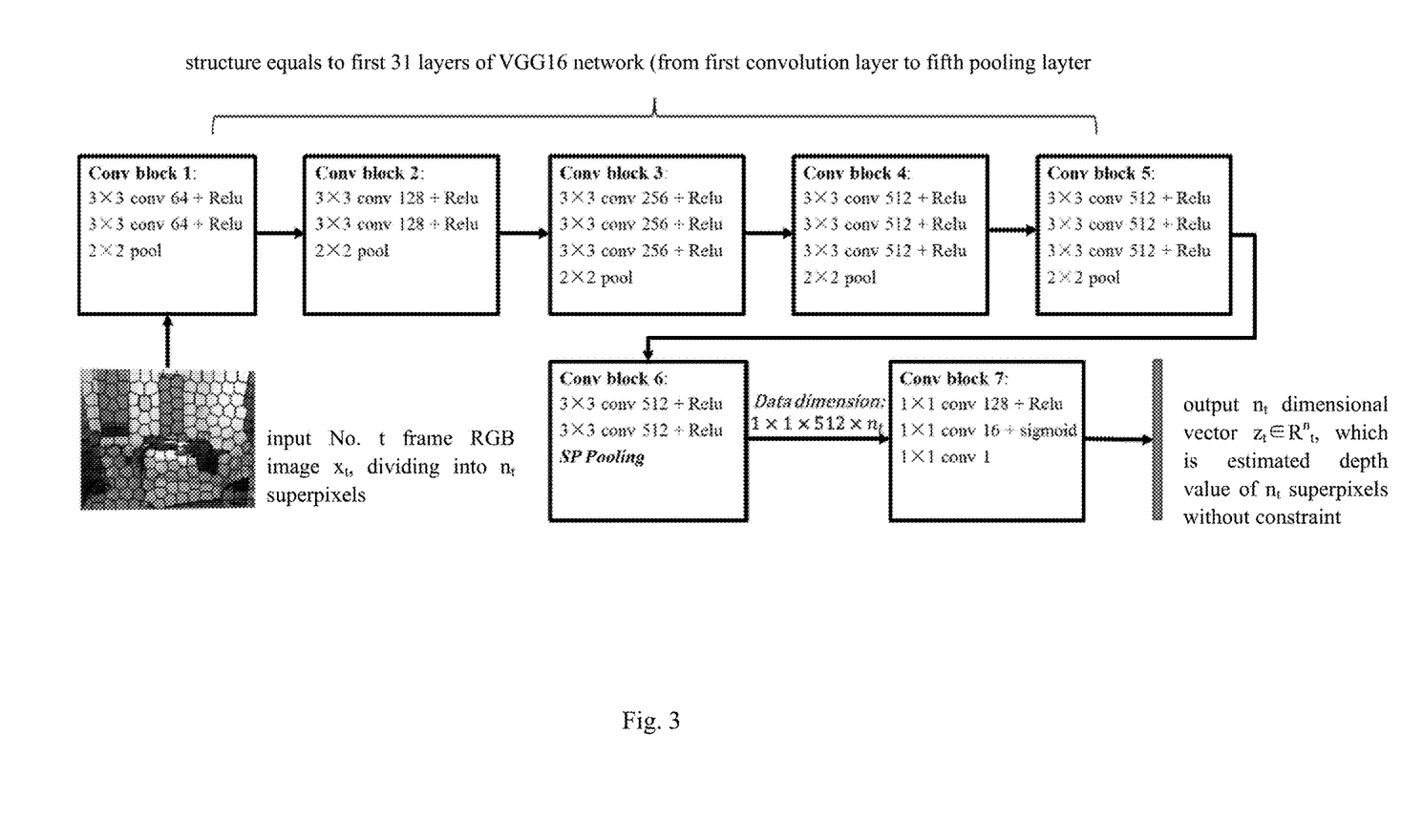
FIG. 3 is the model structure of the single superpixel depth recovery network.
Figure 4:
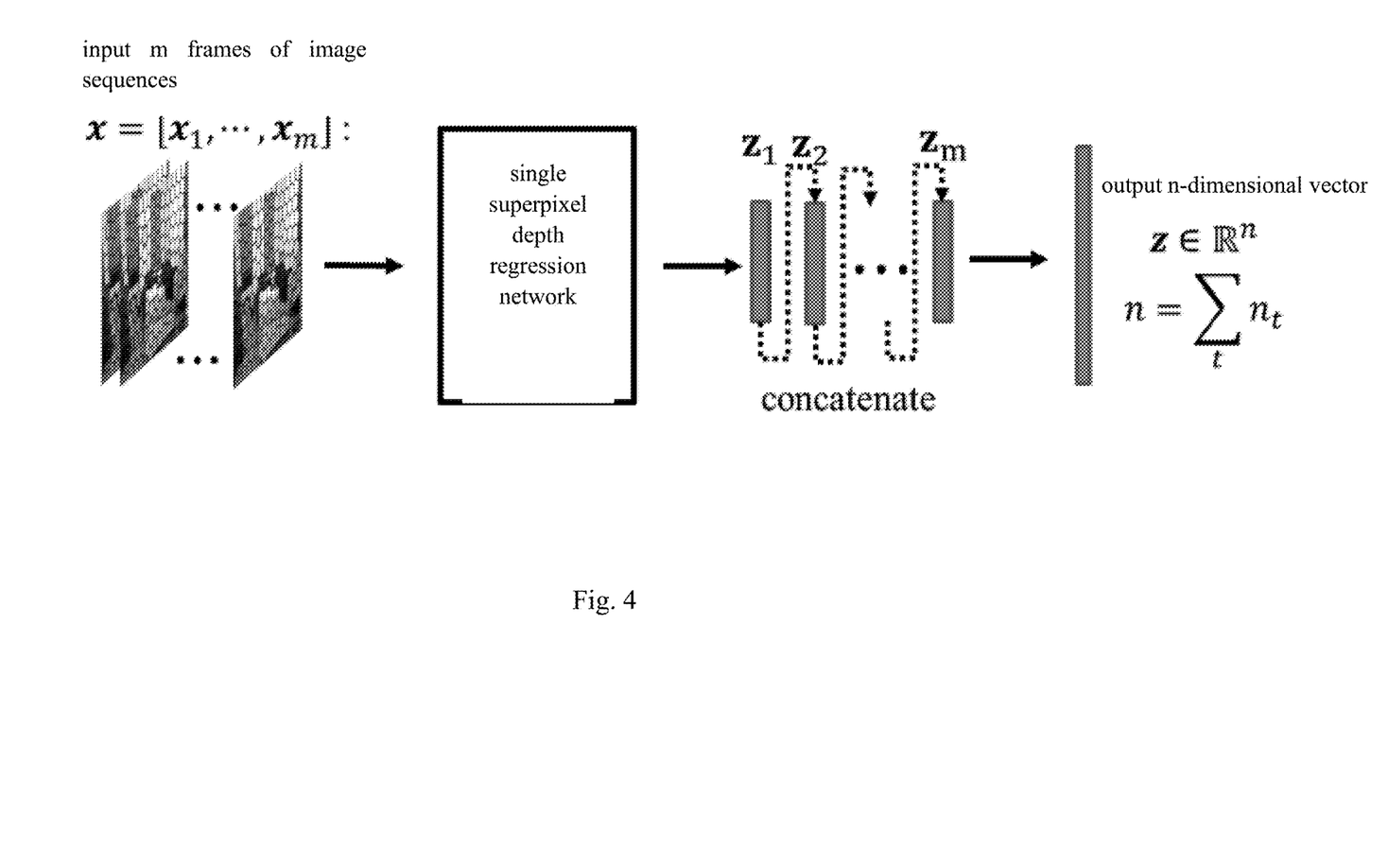
FIG. 4 illustrates applying a single superpixel depth to multi-frame images.

Referring to FIG. 1, a flow chart according to an embodiment of the present invention, a method of the present invention comprises steps of:

1) collecting a training set, wherein each training sample of the training set comprises a continuous RGB (red, green, blue) image sequence with m frames, and a corresponding depth map sequence;

2) using the method presented in Chang Jason et al. A video representation using temporal superpixels. CVPR 2013 to process each image sequence in the training set with spatial-temporal consistency superpixel segmentation, and establishing a spatial similarity matrix $S^{(s)}$ and a temporal similarity matrix $S^{(t)}$;

3) building the convolution neural network structure, wherein the convolution neural network comprises a single superpixel depth regression network with a parameter W, and a spatial-temporal consistency condition random field loss layer with a parameter $\alpha$;

4) training the convolution neural network established in the step 3) with the continuous RGB image sequences and the corresponding depth map sequences in the training set, so as to obtain the parameter W and the parameter $\alpha$; and 5) recovering a depth map sequence of a RGB image sequence with unknown depth through forward propagation of the trained convolution neural network.

According to the embodiment, the step 2) specifically comprises steps of:

(2.1) processing the continuous RGB image sequence in the training set with the spatial-temporal consistency superpixel segmentation, wherein an input sequence is marked as $I=[I_1, \ldots, I_m]$, where $I_t$ is a t-th frame of the m frames in total; the m frames are respectively divided into $n_1, \ldots, n_m$ superpixels by the spatial-temporal consistency superpixel segmentation while a corresponding relation between all superpixels in a later frame and superpixels corresponding to a same object in a former frame is generated; the whole image sequence comprises $$n = \sum_{t=1}^{m} n_t$$

superpixels; marking the real depth at a gravity center of each superpixel p as $d_p$, and defining a ground-truth depth vector of the n superpixels as $d=[d_1; \ldots; d_n]$;

(2.2) establishing the spatial similarity matrix $S^{(s)}$ of the n superpixels, wherein $S^{(s)}$ is an n×n matrix; $S_{pq}^{(s)}$ represents a similarity relationship of a superpixel p and a superpixel q in one frame, where:

$$S_{pq}^{(s)} = \begin{cases} \exp(-\gamma\|c_p - c_q\|^2), & \text{superpixels } p \text{ and } q \text{ are adjacent in one frame} \\ 0, & \text{else} \end{cases}$$

wherein $c_p$ and $c_q$ are color histogram features of the superpixel p and the superpixel q, and γ is a manually determined parameter which is set to the median of $\|c_p - c_q\|^2$ of adjacent superpixels; and (2.3) establishing the temporal similarity matrix $S^{(t)}$ of the n superpixels, wherein $S^{(t)}$ is an n×n matrix; $S_{pq}^{(t)}$ represents a similarity relation of a superpixel p and a superpixel q in different frames:

$$S_{pq}^{(t)} = \begin{cases} 1, & \text{superpixels } p \text{ and } q \text{ correspond to each other in adjacent frames} \\ 0, & \text{else} \end{cases}$$

wherein a corresponding relation between the superpixels of the adjacent frames is obtained by the spatial-temporal consistency superpixel segmentation of the step (2.1).

Preferably, in the step 3), the convolution neural network comprises the single superpixel depth regression network and a spatial-temporal consistency condition random field loss layer; wherein the step 3) specifically comprises steps of:

(3.1) for the single superpixel depth regression network comprising first 31 layers of a VGG16 network, a superpixel pooling layer and three fully connected layers, which performs average pooling in each superpixel space of the superpixel pooling layer; wherein an input of the network is continuous RGB images of m frames and the output of the network is an n-dimensional vector $z=[z_1, \ldots z_n]$, in which the p-th element $z_p$ is the estimated depth value, without considering any constraint, of the superpixel p of the continuous RGB image sequence after the spatial-temporal consistency superpixel segmentation; the convolution neural network parameter need to be learned is W; and (3.2) using the output $z=[z_1, \ldots z_n]$ of the single superpixel depth regression network obtained in the step (3.1), the real depth vector $d=[d_1; \ldots; d_n]$ of the superpixels obtained in the step (2.1), and the spatial similarity matrix $S_{pq}^{(s)}$ obtained in the step (2.2) as well as the temporal similarity matrix $S_{pq}^{(t)}$ obtained in the step (2.3) as the input of the spatial-temporal consistency condition random field loss layer; wherein a conditional probability function of a spatial-temporal consistency condition random field is:

$$P(d\mid I) = \frac{1}{Z(I)}\exp(-E(d, I))$$

wherein an energy function E(d, I) is defined as:

$$E(d, I) = \sum_{p\in N}(d_p - z_p)^2 + \sum_{(p,q)\in S}\alpha^{(s)}S_{pq}^{(s)}(d_p - d_q)^2 + \sum_{(p,q)\in T}\alpha^{(t)}S_{pq}^{(t)}(d_p - d_q)^2$$

wherein the first term $\Sigma_{p\in N}(d_p-z_p)^2$ of the energy function refers to a difference between an estimated value and a real value of a single superpixel; a second term $\Sigma_{(p,q)\in S}\alpha^{(s)}S_{pq}^{(s)}(d_p-d_q)^2$ is a spatial consistency constraint, which means depths will be similar if the superpixels p and q are adjacent in one frame with similar colors (i.e. $S_{pq}^{(s)}$ is larger); a third term $\Sigma_{(p,q)\in T}\alpha^{(t)}S_{pq}^{(t)}(d_p-d_q)^2$ is a temporal consistency constraint, which means the depths will be similar if the superpixels p and q refer to a same object in adjacent frames (i.e. $S_{pq}^{(t)}=1$); a matrix form of the energy function is:

$$E(d,I)=d^T L d - 2z^T d + z^T z$$

wherein:

$$L = \mathbb{I} + D - M$$

$$M = \alpha^{(s)}S^{(s)} + \alpha^{(t)}S^{(t)}$$

wherein $S^{(s)}$ is the spatial similarity matrix obtained in the step (2.2) and $S^{(t)}$ is the temporal similarity matrix obtained in the step (2.3); $\alpha^{(s)}$ and $\alpha^{(t)}$ are two parameters to be learned; $\mathbb{I}$ is an n×n unit matrix; D is a diagonal matrix, and $D_{pp}=\Sigma_q M_{pq}$;

wherein:

$$Z(I) = \int_d \exp(-E(d, I))dd = \frac{\pi^{\frac{n}{2}}}{|L|}\exp(z^T L^{-1} z - z^T z)$$

wherein $L^{-1}$ is the inverse matrix of L, and $|L|$ is the determinant of matrix L;

therefore, a loss function is defined as a negative logarithm of the conditional probability function:

$$J = -\log P(d\mid I) = -d^T L d + 2z^T d - z^T L^{-1} z - \frac{1}{2}\log(|L|) + \frac{n}{2}\log(\pi).$$

Preferably, in the step 4), training the convolution neural network specifically comprises steps of:

(4.1) optimizing the parameters W, $\alpha^{(s)}$ and $\alpha^{(t)}$ using stochastic gradient descent, wherein for each iteration, the parameters are updated as:

$$W = W - lr\frac{\partial J}{\partial W}$$

$$\alpha^{(s)} = a^{(z)} - lr\frac{\partial J}{\partial \alpha^{(s)}}$$

$$\alpha^{(t)} = a^{(t)} - lr\frac{\partial J}{\partial \alpha^{(t)}}$$

wherein lr is the learning rate;

(4.2) calculating the partial derivative of parameter W partial with respect to the loss function J with:

$$\frac{\partial J}{\partial W} = 2(L^{-1}z - d)^T \frac{\partial z}{\partial W}$$

wherein $$\frac{\partial z}{\partial W}$$

is calculated with backward propagation of the convolution neural network layer by layer; and (4.3) respectively calculating the partial derivative of parameters $\alpha^{(s)}$ and $\alpha^{(t)}$ with respect to the loss function J as $$\frac{\partial J}{\partial \alpha^{(s)}}$$

and $$\frac{\partial J}{\partial \alpha^{(t)}}:$$

$$\frac{\partial J}{\partial \alpha^{(s)}} = d^T A^{(s)} d - z^T L^{-1} A^{(s)} L^{-1} z - \frac{1}{2} Tr(L^{-1} A^{(s)})$$

$$\frac{\partial J}{\partial \alpha^{(t)}} = d^T A^{(t)} d - z^T L^{-1} A^{(t)} L^{-1} z - \frac{1}{2} Tr(L^{-1} A^{(t)})$$

wherein $Tr(\cdot)$ represents the trace of a matrix; $A^{(s)}$ is the partial derivative of the matrix L with respect to $\alpha^{(s)}$ and $A^{(t)}$ is the partial derivative of the matrix L with respect to $\alpha^{(t)}$, which are calculated with:

$$A_{pq}^{(s)} = -S_{pq}^{(s)} + \delta(p=q) \Sigma_a S_{pq}^{(s)}$$

$$A_{pq}^{(t)} = -S_{pq}^{(t)} + \delta(p=q) \Sigma_a S_{pq}^{(t)}$$

wherein $\delta(p=q)$ equals 1 when p=g, otherwise 0.

Preferably, in the step 5), recovering the depth-unknown RGB image sequence specifically comprises steps of:

(5.1) processing the RGB image sequence with the spatial-temporal consistency superpixel segmentation, and calculating the spatial similarity matrix $S^{(s)}$ and the temporal similarity matrix $S^{(t)}$;

(5.2) apply forward propagation to the RGB image sequence with the convolution neural network trained, so as to obtain a single superpixel network output z;

(5.3) calculating the depth output $\hat{d} = [\hat{d}_1; \ldots; \hat{d}_n]$ with spatial-temporal consistency constraint by:

$$\hat{d} = L^{-1} z$$

wherein the matrix L is calculated in the step (3.2); $\hat{d}_p$ represents an estimated depth value of a superpixel p in the RGB image sequence; and (5.4) applying $\hat{d}_p$ to a corresponding position of a corresponding frame of the superpixel p for obtaining a depth map of the m frames.

The present invention has been compared with several existing methods based on a public data set NYU depth v2 and a data set LYB 3D-TV of the inventor. In detail, NYU depth v2 comprises 795 training scenes and 654 testing scenes, wherein each scene comprises 30 frames of continuous RGB images and their corresponding depth maps. LYU 3D-TV comprises scenes from TV series "Nirvana in Fire", wherein 5124 frames from 60 scenes and their manually-annotated depth maps are used as a training set, and 1278 frames from 20 scenes and their manually-marked depth maps are used as a testing set. Depth recovery accuracy of the method of the present invention is compared with those of the following method:

1. Depth transfer: Karsch, Kevin, Ce Liu, and Sing Bing Kang. "Depth transfer: Depth extraction from video using non-parametric sampling." IEEE transactions on pattern analysis and machine intelligence 36.11 (2014): 2144-2158.
2. discrete-continuous CRF: Liu, Miaomiao, Mathieu Salzmann, and Xuming He. "Discrete-continuous depth estimation from a single image." Proceedings of the IEEE Conference on Computer Vision and Pattern Recognition. 2014.
3. Multi-scale CNN: Eigen, David, Christian Puhrsch, and Rob Fergus. "Depth map prediction from a single image using a multi-scale deep network." Advances in neural information processing systems. 2014 (Multi-scale CNN).
4. 2D-DCNF: Liu, Favao, et al. "Learning depth from single monocular images using deep convolutional neural fields." IEEE transactions on pattern analysis and machine intelligence.

The results show that the accuracy of the method of the present invention is improved relative to the comparative methods, while the inter-frame jump during depth map recovery is significantly reduced.

TABLE 1

Depth recovery accuracy comparison with NYU depth v2

| Method | Error (lower is better) | | | Accuracy of threshold t (higher is better) | | |
| --- | --- | --- | --- | --- | --- | --- |
| | rel | log10 | rms | t = 1.25 | t = 1.25² | t = 1.25³ |
| Depthtransfer | 0.35 | 0.131 | 1.2 | — | — | — |
| discrete-continuousCRF | 0.335 | 0.127 | 1.06 | — | — | — |
| Multi-scaleCNN | 0.245 | — | 0.907 | 0.611 | 0.887 | 0.971 |
| 2D-DCNF | 0.213 | 0.087 | 0.759 | 0.650 | 0.906 | 0.976 |
| Our method | 0.188 | 0.085 | 0.699 | 0.690 | 0.923 | 0.985 |

TABLE 2

Depth recovery accuracy comparison with LYB-3D TV

| Method | Error (lower is better) | | Accuracy of threshold t (higher is better) | | |
| --- | --- | --- | --- | --- | --- |
| | rel | rms | t = 1.25 | t = 1.25² | t = 1.25³ |
| Multi-scaleCNN[5] | 0.264 | 0.161 | 0.572 | 0.810 | 0.941 |
| 2D-DCNF[13] | 0.234 | 0.132 | 0.623 | 0.860 | 0.960 |
| Spatial-temporal-DCNF(ours) | 0.225 | 0.135 | 0.648 | 0.889 | 0.968 |

What is claimed is:

1. A method for generating spatial-temporally consistent depth map sequences based on convolution neural networks, comprising steps of:
   1) collecting a training set, wherein each training sample of the training set comprises a continuous RGB (red, green, blue) image sequence of m frames, and a corresponding depth map sequence;
   2) processing each image sequence in the training set with spatial-temporal consistency superpixel segmentation, and establishing a spatial similarity matrix $S^{(s)}$ and a temporal similarity matrix $S^{(t)}$;
   3) building a convolution neural network structure, wherein the convolution neural network comprises a single superpixel depth regression network with a parameter W, and a spatial-temporal consistency condition random field loss layer with a parameter $\alpha$;

4) training the convolution neural network established in the step 3) with the continuous RGB image sequence and the corresponding depth map sequence in the training set, so as to obtain the parameter W and the parameter $\alpha$; and 5) recovering a depth map sequence of a depth-unknown RGB image sequence through forward propagation with the convolution neural network trained;

wherein the step 2) specifically comprises steps of:

(2.1) processing the continuous RGB image sequence in the training set with the spatial-temporal consistency superpixel segmentation, wherein an input sequence is marked as $I=[I_1, \ldots, I_m]$, where $I_t$ is a t-th frame of the m frames in total; the m frames are respectively divided into $n_1, \ldots, n_m$ superpixels by the spatial-temporal consistency superpixel segmentation while a corresponding relation between all superpixels in a later frame and superpixels corresponding to a same object in a former frame is generated; the whole image sequence comprises $$n = \sum_{t=1}^{m} n_t$$

superpixels; marking a real depth at a gravity center of each superpixel p as $d_p$, and defining a ground-truth depth vector of the n superpixels as $d=[d_1; \ldots; d_n]$;

(2.2) establishing the spatial similarity matrix $S^{(s)}$ of the n superpixels, wherein $S^{(s)}$ is an n×n matrix; $S_{pq}^{(s)}$ represents a similarity relationship of a superpixel p and a superpixel q in one frame, where:

$$S_{pq}^{(s)} = \begin{cases} \exp(-\gamma\|c_p - c_q\|^2), & \text{superpixels } p \text{ and } q \text{ are adjacent in one frame} \\ 0, & \text{else} \end{cases}$$

wherein $c_p$ and $c_q$ are color histogram features of the superpixel p and the superpixel q, and $\gamma$ is a manually determined parameter which is set to the median of $\|c_p-c_q\|^2$ of adjacent superpixels; and (2.3) establishing the temporal similarity matrix $S^{(t)}$ of the n superpixels, wherein $S^{(t)}$ is an n×n matrix; $S_{pq}^{(t)}$ represents a similarity relation of a superpixel p and a superpixel q in different frames:

$$S_{pq}^{(t)} = \begin{cases} 1, & \text{superpixels } p \text{ and } q \text{ correspond to each other in adjacent frames} \\ 0, & \text{else} \end{cases}$$

wherein a corresponding relation between the superpixels of the adjacent frames is obtained by the spatial-temporal consistency superpixel segmentation of the step (2.1).

2. The method, as recited in claim 1, wherein in the step 3), the convolution neural network comprises the single superpixel depth regression network and a spatial-temporal consistency condition random field loss layer; wherein the step 3) specifically comprises steps of:

(3.1) for the single superpixel depth regression network comprising first 31 layers of a VGG16 network, a superpixel pooling layer and three fully connected layers, which performs average pooling in each superpixel space of the superpixel pooling layer; wherein an input of the network is continuous RGB images of m frames and an output of the network is an n-dimensional vector $z=[z_1, \ldots z_n]$, in which a p-th element $z_p$ is an estimated depth value, without considering any constraint, of the superpixel p of the continuous RGB image sequence after the spatial-temporal consistency superpixel segmentation; a convolution neural network parameter need to be learned is W; and (3.2) using the output $z=[z_1, \ldots z_n]$ of the single superpixel depth regression network obtained in the step (3.1), the real depth vector $d=[d_1; \ldots; d_n]$ of the superpixels obtained in the step (2.1), and the spatial similarity matrix $S_{pq}^{(s)}$ obtained in the step (2.2) as well as the temporal similarity matrix $S_{pq}^{(t)}$ obtained in the step (2.3) as an input of the spatial-temporal consistency condition random field loss layer; wherein a conditional probability function of a spatial-temporal consistency condition random field is:

$$P(d\mid I) = \frac{1}{Z(I)}\exp(-E(d, I))$$

wherein an energy function E(d,I) is defined as:

$$E(d, I) = \sum_{p\in N}(d_p - z_p)^2 + \sum_{(p,q)\in S}\alpha^{(s)}S_{pq}^{(s)}(d_p - d_q)^2 + \sum_{(p,q)\in T}\alpha^{(t)}S_{pq}^{(t)}(d_p - d_q)^2$$

wherein a first term $\Sigma_{p\in N}(d_p-z_p)^2$ of the energy function refers to a difference between an estimated value and a real value of a single superpixel; a second term $\Sigma_{(p,q)\in S}\alpha^{(s)}S_{pq}^{(s)}(d_p-d_p)^2$ is a spatial consistency constraint, which means depths will be similar if the superpixels p and q are adjacent in one frame with similar colors (i.e. $S_{pq}^{(s)}$ is larger); a third term $\Sigma_{(p,q)\in T}\alpha^{(t)}S_{pq}^{(t)}(d_p-d_p)^2$ is a temporal consistency constraint, which means the depths will be similar if the superpixels p and q refer to a same object in adjacent frames (i.e. $S_{pq}^{(t)}=1$); a matrix form of the energy function is:

$$E(d,I)=d^TLd-2z^Td+z^Tz$$

wherein:

$$L=\mathbb{I}+D-M$$

$$M=\alpha^{(s)}S^{(s)}+\alpha^{(t)}S^{(t)}$$

wherein $S^{(s)}$ is the spatial similarity matrix obtained in the step (2.2) and $S^{(t)}$ is the temporal similarity matrix obtained in the step (2.3); $\alpha^{(s)}$ and $\alpha^{(t)}$ are two parameters to be learned, I is an n×n unit matrix; D is a diagonal matrix, and $D_{pp}=\Sigma_q M_{pq}$;

wherein:

$$Z(I) = \int_d \exp(-E(d, I))dd = \frac{\pi^{\frac{n}{2}}}{|L|}\exp(z^TL^{-1}z - z^Tz)$$

wherein $L^{-1}$ is an inverse matrix of L, and |L| is a determinant of the matrix L;

therefore, a loss function is defined as a negative logarithm of the conditional probability function:

$$J = -\log P(d \mid I) = -d^T L d + 2 z^T d - z^T L^{-1} z - \frac{1}{2}\log(|L|) + \frac{n}{2}\log(\pi).$$

3. The method, as recited in claim 2, wherein in the step 4), training the convolution neural network specifically comprises steps of:
(4.1) optimizing the parameters W, $\alpha^{(s)}$ and $\alpha^{(t)}$ using stochastic gradient descent, wherein for each iteration, the parameters are updated as:

$$W = W - lr \frac{\partial J}{\partial W}$$

$$\alpha^{(s)} = \alpha^{(s)} - lr \frac{\partial J}{\partial \alpha^{(s)}}$$

$$\alpha^{(t)} = \alpha^{(t)} - lr \frac{\partial J}{\partial \alpha^{(t)}}$$

wherein lr is the learning rate;
(4.2) calculating partial derivative of a parameter W partial with respect to the loss function J with:

$$\frac{\partial J}{\partial W} = 2(L^{-1} z - d)^T \frac{\partial z}{\partial W}$$

wherein $$\frac{\partial z}{\partial W}$$

is calculated with backward propagation of the convolution neural network layer by layer; and
(4.3) respectively calculating partial derivative of parameters $\alpha^{(s)}$ and $\alpha^{(t)}$ with respect to the loss function J as $$\frac{\partial J}{\partial \alpha^{(s)}}$$

and $$\frac{\partial J}{\partial \alpha^{(t)}}:$$

$$\frac{\partial J}{\partial \alpha^{(s)}} = d^T A^{(s)} d - z^T L^{-1} A^{(s)} L^{-1} z - \frac{1}{2} Tr(L^{-1} A^{(s)})$$

$$\frac{\partial J}{\partial \alpha^{(t)}} = d^T A^{(t)} d - z^T L^{-1} A^{(t)} L^{-1} z - \frac{1}{2} Tr(L^{-1} A^{(t)})$$

wherein $Tr(\cdot)$ represents a trace of a matrix; $A^{(s)}$ is partial derivative of the matrix L with respect to $\alpha^{(s)}$ and $A^{(t)}$ is partial derivative of the matrix L with respect to $\alpha^{(t)}$, which are calculated with:

$$A_{pq}^{(s)} = -S_{pq}^{(s)} + \delta(p=q) \Sigma_a S_{pq}^{(s)}$$

$$A_{pq}^{(t)} = -S_{pq}^{(t)} + \delta(p=q) \Sigma_a S_{pq}^{(t)}$$

wherein $\delta(p=q)$ equals 1 when p=g, otherwise 0.

4. The method, as recited in claim 3, wherein in the step 5), recovering the depth-unknown RGB image sequence specifically comprises steps of:
(5.1) processing the RGB image sequence with the spatial-temporal consistency superpixel segmentation, and calculating the spatial similarity matrix $S^{(s)}$ and the temporal similarity matrix $S^{(t)}$;
(5.2) applying the forward propagation to the RGB image sequence with the convolution neural network trained, so as to obtain a single superpixel network output z;
(5.3) calculating a depth output $\hat{d}=[\hat{d}_1; \ldots; \hat{d}_n]$ with spatial-temporal consistency constraint by:

$$\hat{d} = L^{-1} z$$

wherein the matrix L is calculated in the step (3.2); $\hat{d}_p$ represents an estimated depth value of a superpixel p in the RGB image sequence; and
(5.4) applying $\hat{d}_p$ to a corresponding position of a corresponding frame of the superpixel p for obtaining a depth map of the m frames.

* * * * *